United States Patent [19]

Matumoto et al.

[11] Patent Number: 5,052,907
[45] Date of Patent: Oct. 1, 1991

[54] RESIN SEALING APPARATUS FOR USE IN MANUFACTURING A RESIN-SEALED SEMICONDUCTOR DEVICE

[75] Inventors: Yoshihiko Matumoto, Hyogo; Hisanobu Takahama, Himeji, both of Japan

[73] Assignee: Kabushiki Kaisha Toshiba, Kawasaki, Japan

[21] Appl. No.: 546,313

[22] Filed: Jul. 3, 1990

[30] Foreign Application Priority Data

Jul. 4, 1989 [JP] Japan .................... 1-172292

[51] Int. Cl.5 .............. B29C 45/02; B29C 45/27; B29C 45/34
[52] U.S. Cl. ......................... 425/116; 249/95; 264/272.17; 425/544; 425/546; 425/588; 425/DIG. 228
[58] Field of Search ............. 249/95; 264/272.17; 425/116, 121, 543, 544, 588, 546, 420, 812, DIG. 229, DIG. 228

[56] References Cited

U.S. PATENT DOCUMENTS

| 3,659,821 | 5/1972 | Sakamoto et al. | 264/272.17 |
| 3,779,506 | 12/1973 | Adams | 425/812 |
| 4,012,025 | 3/1977 | Ernst et al. | 425/DIG. 229 |

FOREIGN PATENT DOCUMENTS

| 60-127112 | 7/1985 | Japan | 425/812 |
| 62-273814 | 11/1987 | Japan | 264/272.17 |
| 63-89319 | 4/1988 | Japan | 425/544 |

Primary Examiner—Jay H. Woo
Assistant Examiner—Khanh P. Nguyen
Attorney, Agent, or Firm—Finnegan, Henderson, Farabow, Garrett and Dunner

[57] ABSTRACT

A resin sealing apparatus that has separable molds having a pot in which resin is injected. The pot communicates with cavities, in which semiconductor chips are set, by runners. The runners lead the resin injected in the pot to the cavities. A recess is provided at the distal end of each runner to hold the resin and air pressed out from the runner.

2 Claims, 6 Drawing Sheets

|  | CONVENTIONAL ART | PRESENT INVENTION |
|---|---|---|
| MASS OF RESIN TO BE INJECTED | 70 g | 35 g |
| EFFICIENCY OF USE OF RESIN | 7 % | 14 % |
| DIFFERENCES IN FIGURE OF MOLD — CULL (13A) | (trapezoid shape) | (stepped shape) |
| DIAMETER | 63 | 46 |
| RUNNER (15A) | (trapezoid) | (circle) |
| RUNNER (15B) | (trapezoid) | (circle) |
| RUNNER (15C) | (trapezoid) | (circle) |
| RUNNER (15D) | (hexagon) | (circle) |
| INTERVAL BETWEEN RUNNERS | 60 ($l_B$) <br> 110 ($l_C$) | 55 ($l_B$) <br> 55 ($l_C$) |
| INTERVAL BETWEEN FRAMES | 10 ($l_A$) | 7 ($l_A$) |
| AREA OF USEFUL PORTION (LENGTH × WIDTH) | 261 × 428 <br> ⇩ <br> 1117 cm$^2$ | 191 × 408 <br> ⇩ <br> 779 cm$^2$ |

(UNIT) mm

F I G. 7

RESIN SEALING APPARATUS FOR USE IN MANUFACTURING A RESIN-SEALED SEMICONDUCTOR DEVICE

BACKGROUND OF THE INVENTION

1. Field of the Invention

This invention relates to an improved resin sealing apparatus for use in manufacturing a resin-sealed semiconductor device.

2. Description of the Related Art

Resin sealing is one of methods of sealing semiconductor chips. There are known various resin sealing methods, among which is the transfer mold method. Since the transfer mold method ensures mass production of semiconductor chips at low cost, it is the most popular resin sealing methods at present.

FIG. 1 shows a mold of a conventional pot-type transfer mold apparatus, and FIG. 2 is a longitudinal cross-sectional view of the apparatus of FIG. 1. Molds 11A and 11B are separable upward and downward. Mold 11A has pot 13 at its center, in which resin is injected, and cavities communicating with pot 13 and having a shape corresponding to that of the semiconductor device package. Resin, material to be molded, is injected into pot 13, pressed by plunger 14 inserted in pot 13 to a predetermined pressure, and supplied into each cavity 12.

FIG. 3 shows a layout of mold 11B, in which the same portions shown in FIGS. 1 and 2 are identified by the same numerals as are used in FIGS. 1 and 2. Runners 15 or resin supplying paths are formed between pot 13 on the one hand and each cavity 12 on the other hand. Semiconductor chip 17 provided with a predetermined wire bonding is put on lead frame 16 and is arranged in each cavity 12.

In the apparatus as described above, in which mold 11B is arranged on mold 11A, when resin is injected into pot 13 and pressed by plunger 14 it is injected through runners 15 into each cavity 12, thus sealing the semiconductor chip 17 set therein. While a predetermined pressure is being applied to the resin, molds 11A and 11B are heated to 150° to 190° C., thermally setting the resin. Then, molds 11A and 11B are opened, and the semiconductor devices sealed with the resin are removed from the molds. In this way, a resin mold process is completed.

The resin mold process has the following drawback that, when resin is injected, air existing in hollow portions, such as pot 13, runner 15 and cavities 12, is entrapped. More specifically, as resin is supplied from pot 13 through runner 15 into cavities 12, the air existing in the hollow portions enters the resin, inevitably forming pin holes in the surface of the semiconductor device package. The holes impair the appearance of the device. Moreover, the holes may adversely affect the subsequent manufacturing steps, decreasing the production efficiency and the reliability of the product.

FIGS. 4A to 4C show products formed by the abovedescribed process. Resin 19 is supplied from pot 13 through runner 15 to cavities 12. The resin in pot 13 is called cull 13A. It is desirable that no holes be formed as shown in FIG. 4A in the product (package) made of resin 19 and located in cavities 12. However, in general, pin holes 18 are formed in resin 19 in cavities 12 as shown in FIGS. 4B and 4C.

To reduce holes 18 the following measures have been taken hitherto: to adjust the speed of injecting resin; to adjust the pressure applied to the resin after the injection; to provide air vents to cavities; and to heat the mold at a low temperature. However, these measures have drawbacks, as will be described below.

If the speed of injecting the resin is too low, the resin may be hardened before it fills all cavities. If the pressure on resin is too high, the resin may exude from a small gap of the mold, hindering the succeeding manufacturing steps. If the speed of injecting the resin is too high, or the pressure on the resin is too low, a great number of holes may be formed in the product.

Air vents, if provided, must be very small, particularly in a micro-semiconductor device. Such small vents may become clogged with resin, disabling the air vents to function. While the resin can be removed from he air vents each time the vents become clogged, the operating efficiency of the apparatus will, however, be lowered as a result. Hence, it is not practical to remove the resin from the air vents during consecutive operations.

If the mold is heated at low temperature, the resin quality may be degraded or else the reliability of the semiconductor device may be reduced. Hence, it is not advisable to heat the mold at a low temperature.

In addition, if the diameter of the cull and the capacity of the pot are both large, or the runners are long, air may easily enter the resin, and form holes in the molded packages. Further, if the runner has an angular cross section, the air existing in a corner of the runner enters into cavities when resin is pressed into the cavities, and forms holes in the resin in the cavities.

SUMMARY OF THE INVENTION

It is accordingly an object of the present invention to provide a resin sealing apparatus which satisfactorily suppresses the formation of holes in the resin for use in forming a semiconductor device package.

The object is achieved by a resin sealing apparatus for sealing a semiconductor chip with resin by means of a mold, comprising: a pot in which the resin is injected; cavities in which the semiconductor chips are set; runners communicating with the pot and the cavities for leading the resin from the pot to the cavities; and recesses formed at the distal end of each of the runners for holding the resin pressed out from the runner.

According to this apparatus, because of the recess formed at the end of the runner, the air which enters the resin during the resin injection is pressed out to the recess. Thus, since substantially no air is left in the cavity, holes are rarely formed in the surface of the semiconductor device package.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 7 is a table showing structural differences between the mold of the present invention and the conventional mold.

DETAILED DESCRIPTION OF THE PREFERRED EMBODIMENTS

An embodiment of the present invention will be described below with reference to the accompanying drawings.

Figure 1:
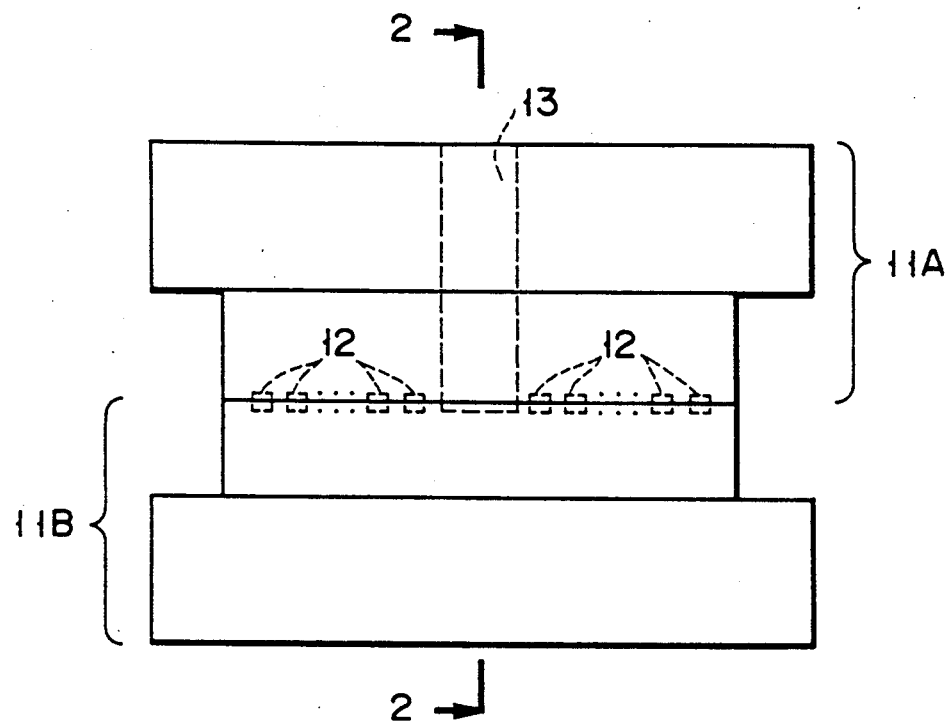
FIG. 1 is a side view of a mold of a conventional resin sealing apparatus.
Figure 2:
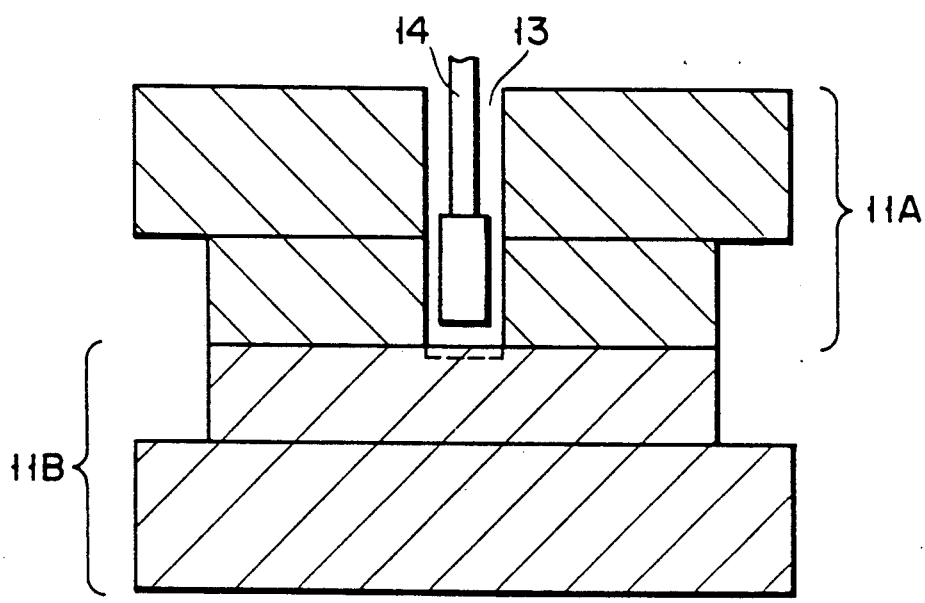
FIG. 2 is a cross-sectional view of the mold taken along the line 2—2 of FIG. 1.
Figure 3:
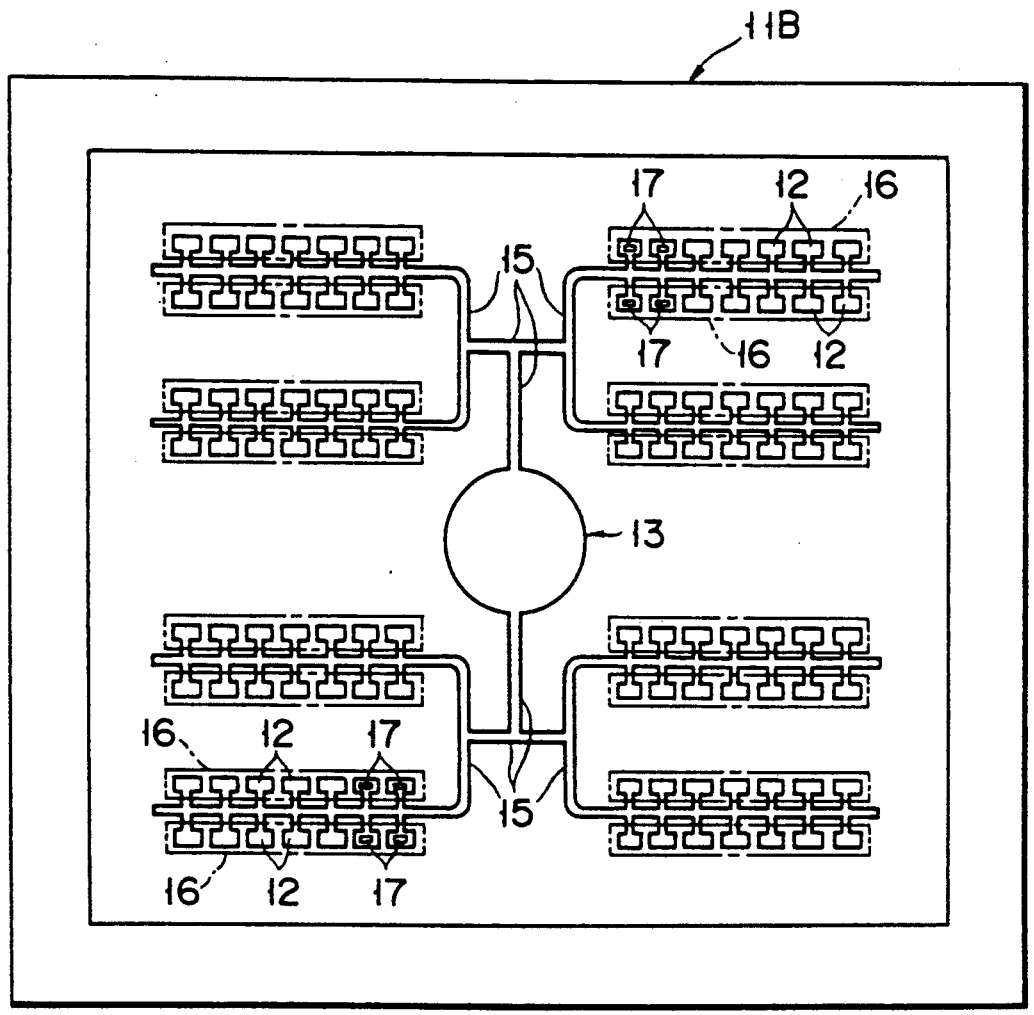
FIG. 3 is a plan view showing a layout of the mold shown in FIGS. 1 and 2.
Figure 4A:
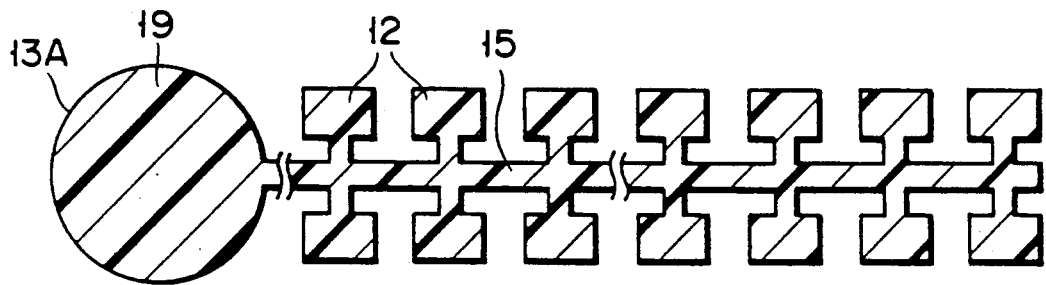
FIGS. 4A to 4C are views illustrating holes formed through a resin sealing process by means of the conventional apparatus.
Figure 4B:
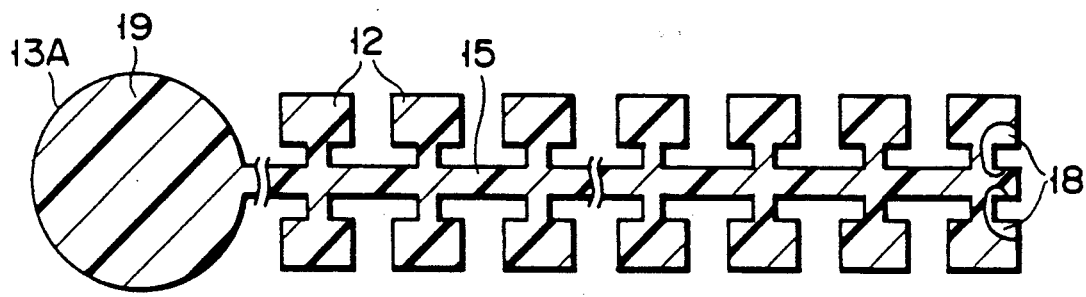
Figure 4C:
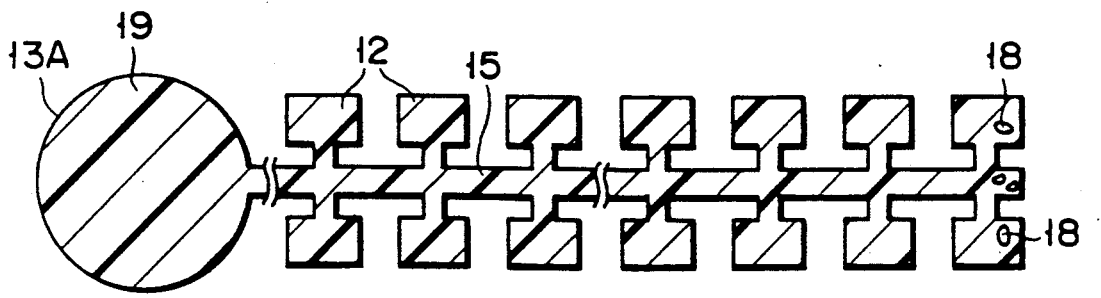
Figure 5:
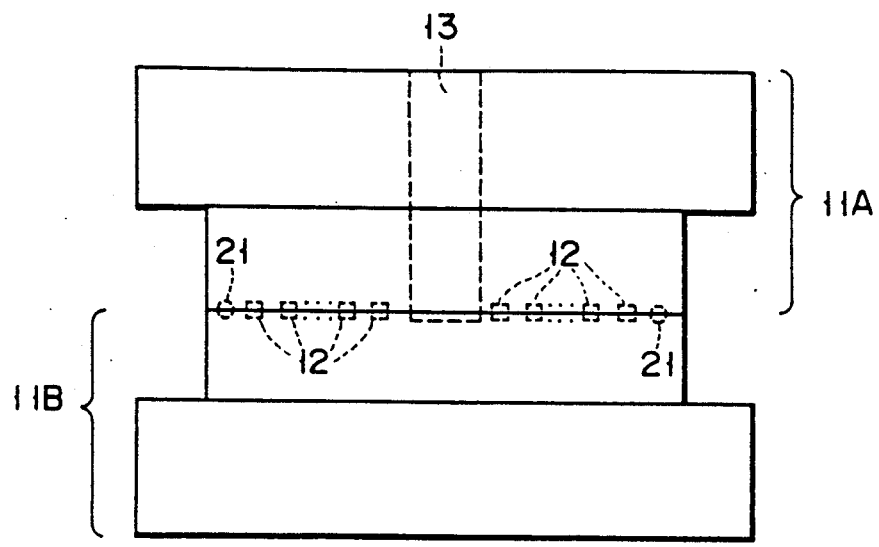
FIG. 5 is a side view of the mold of the resin sealing apparatus according to an embodiment of the present invention.
Figure 6:
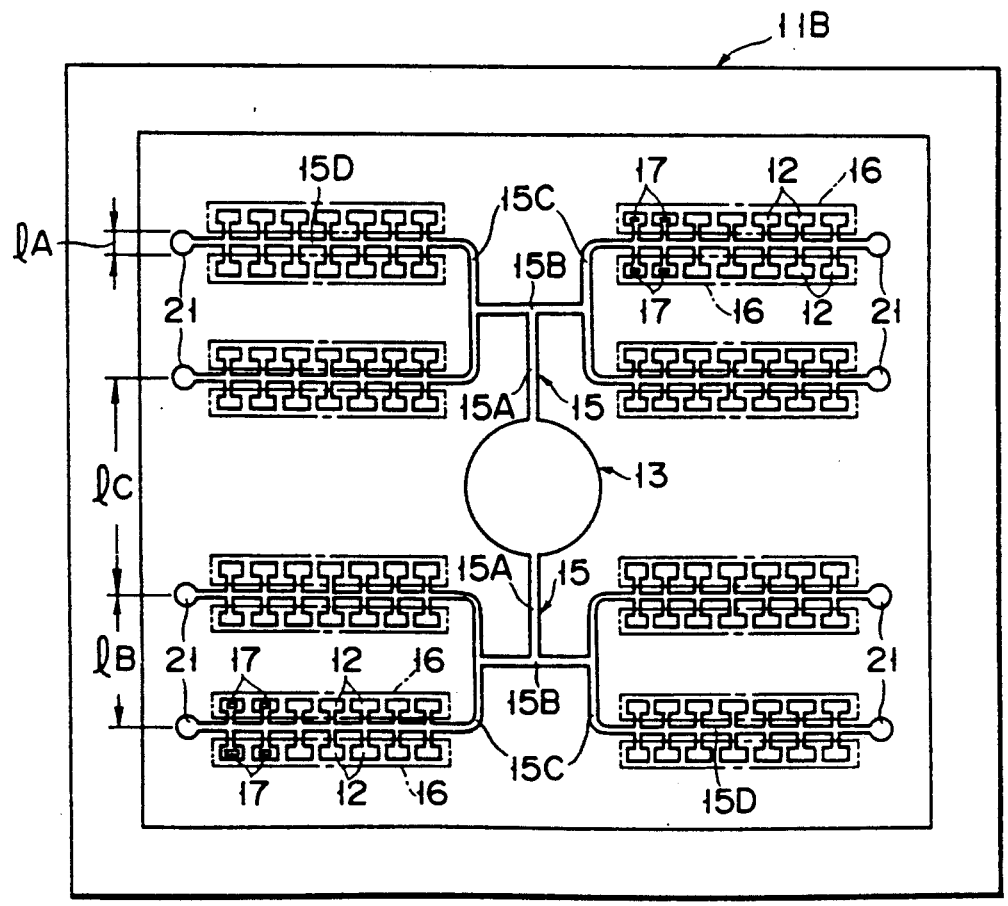
FIG. 6 is a plan view showing a layout of the mold shown in FIG. 5.

FIGS. 5 and 6 show an embodiment of the present invention. In FIGS. 5 and 6, the same portions as in FIGS. 1 and 2 are identified by the same numerals as used in FIGS. 1 and 2.

As shown in FIGS. 6 and 7, in the present invention, the volume of the pot and the runner is reduced, as compared to that of the conventional apparatus, to as small as possible, making the mold compact. More specifically, the diameter of cull 13A is reduced from about 60 mm to about 40 mm, thus decreasing the volume of pot 13. The length of runner 15A is reduced from 60 mm to 55 mm, and that of runner 15B is reduced from 110 mm to 55 mm. The interval 1A between lead frames 16 is reduced from 10 mm to 7 mm. Since runner 15 is thus shorter than in the conventional apparatus, the amount of air which enters the resin during the resin injection is considerably decreased, thereby suppressing the formation of holes on the surface of the semiconductor device package.

In addition, since the area of the useful portion of molds 11A and 11B is reduced from 1,117 cm$^2$ to 779 cm$^2$, the efficiency of mold pressure is improved by about 1.4 times. Further, since the sizes of molds 11A and 11B are reduced, the length and the section of runner 15 are also reduced. For this reason, the mass of resin required to be injected is reduced from 70 g to 35 g, thus the efficiency of use of resin doubling, from 7% to 14%. Since the amount of the resin to be used is accordingly reduced, the manufacturing cost can be half as much as required in the conventional apparatus. Moreover, since only a little burr is formed in the entire mold, the step of removing the burr is simplified, thereby improving the operating efficiency of the apparatus in the succeeding manufacturing steps.

Furthermore, as shown in FIG. 7, the cross section of runner 15 is circular, unlike in the conventional apparatus. If the cross section of the runner is trapezoidal or hexagonal as in the conventional apparatus, resistance to the flow of the resin is large at the corners. According to the present invention, since the cross section is circular and has no corner, resistance to the flow of the resin is smaller. Hence, the time required to fill the cavities is shorter. In addition, air does not enter the resin easily, unlike in the conventional apparatus.

However, even if the volume of pot 13 and the length of runner 15 is as small as possible, and the cross section of runner 15 is circular, thereby reducing the amount of the air entered in the resin, it is difficult to satisfactorily suppress the entrance of air and the formation of holes.

To satisfactorily suppress the formation of holes in the resin in cavity 12, in the embodiment of this invention, recess 21 is formed at the distal end of each runner 15 for holding resin as shown in FIGS. 5 and 6. Hence, although air entrance is not completely prevented only by the reduction of the volume of pot 13 and runner 15, air which is entrapped in pot 13 and runner 15 by resin is gathered in recess 21 as the resin is pressed. In this embodiment, recess 21 is a spherical space having a diameter of about 7 mm, which is the most preferable size. Recess 21 need not be spherical but may be other shapes.

Figure 8A:
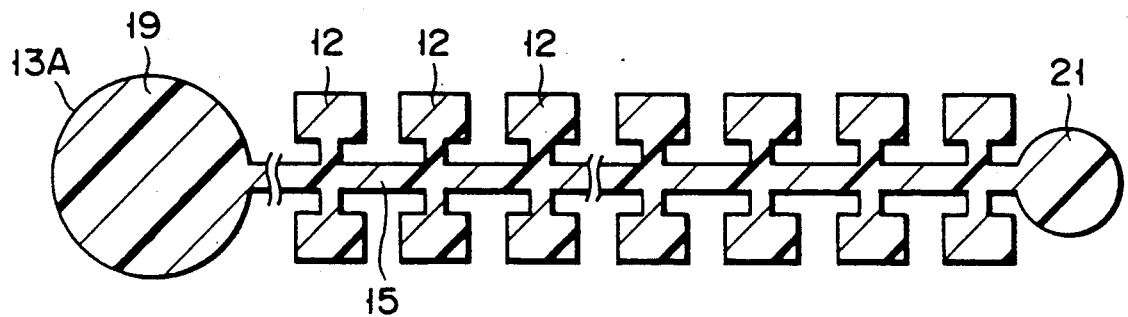
FIGS. 8A to 8C are views illustrating holes formed through a resin sealing process by means of the apparatus of the present invention.
Figure 8B:
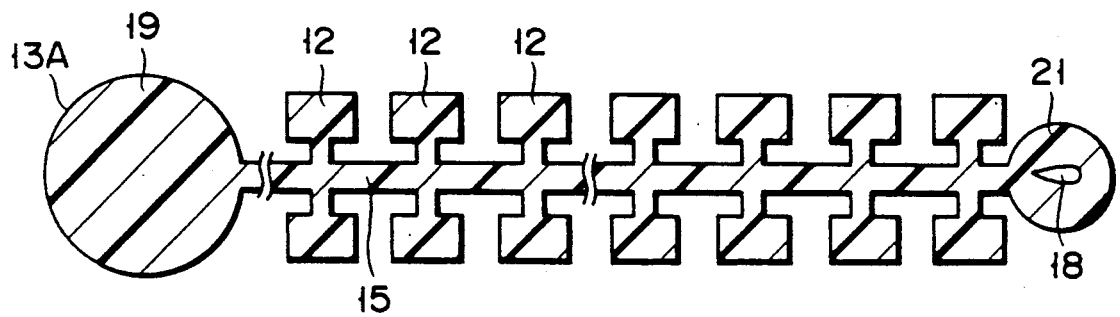
Figure 8C:
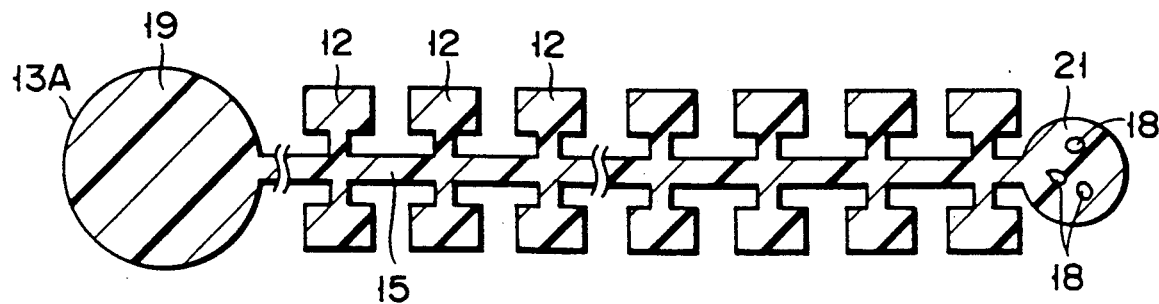

FIGS. 8A to 8C show products obtained by means of the mold according to the embodiment.

It will now be described how the package is produced by using the mold of the embodiment. First, resin 19 is injected into pot 13. As plunger 14 is inserted in pot 13, and a constant pressure is applied to resin 19, resin 19 consecutively fills pot 13, runner 15 and each of cavities 12. Even if air existing in pot 13 and the like enters the resin as the injection of resin 19 proceeds, the air is not left in cavity 12 but pressed out by resin 19 to recess 21. As a result, no hole is formed in the resin in cavity 12, hole 18 being formed on recess 21.

According to the above embodiment, the rate of formation of holes 18 in cavities 12 for forming packages of super-mini transistors is about 10 to 70 ppm. In the conventional apparatus, the rate is 200 to 500 ppm. Thus, the rate of formation of holes is reduced by one seventh.

In addition, since the cross section of runner 15 is circular, the resistance of the runner to the flow of resin is small. As a result, the filling of resin can proceed at a high speed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A resin sealing apparatus for use in sealing semiconductor chips with resin comprising:

a mold;

a pot within said mold in which the resin is injected;

cavities within said mold in which the semiconductor chips are set;

runners within said mold communicating with the pot and the cavities for leading the resin from the pot to the cavities, each of said runners having a circular cross section and a distal end closed within said mold; and recesses closed within said mold formed at the distal end of each runner for holding the resin let out from the runner and air pressed out by the resin.

2. An apparatus according to claim 1, wherein said mold is separated into two portions.

* * * * *